United States Patent [19]

Ki

[11] Patent Number: 5,038,161
[45] Date of Patent: Aug. 6, 1991

[54] METHOD AND A CAMERA FOR COMBINATION PICTURES IN A PHOTOGRAPH

[76] Inventor: Lui S. Ki, Flat 2805, 28F., Tai On House, 57-87 Shaukivwan Road, Hong Kong, Hong Kong

[21] Appl. No.: 462,093

[22] Filed: Jan. 8, 1990

[51] Int. Cl.⁵ .................. G03B 11/00; G03B 13/06
[52] U.S. Cl. .................. 354/125; 354/219; 354/289.1; 354/295
[58] Field of Search ............ 354/110, 125, 219, 295, 354/296, 289.1

[56] References Cited

U.S. PATENT DOCUMENTS

| | | | |
|---|---|---|---|
| 1,543,065 | 6/1925 | Douglas | 354/125 |
| 4,304,471 | 12/1981 | Jones | 354/108 |
| 4,310,232 | 1/1982 | Reed | 354/125 |
| 4,478,501 | 10/1984 | Klancnik | 354/125 |
| 4,655,570 | 4/1987 | Jaffe | 354/107 |
| 4,708,449 | 11/1987 | Thomas | 354/295 |

Primary Examiner—A. A. Mathews
Attorney, Agent, or Firm—St. Onge Steward Johnston & Reens

[57] ABSTRACT

A method and a camera for combination pictures in a photograph in which a transparency film is mounted in a viewer in front of the camera for sighting the relative positions of an image to be photographed and an image to be exposed within the camera. The viewer is removed and the image is photographed onto a primary film while at the same time a secondary film, having a dark figure, is located against the primary film to prevent the primary film from being exposed in the area of the dark figure. The dark figure secondary film is removed from adjacent the primary film and another secondary film, having an image corresponding in shape to the dark figure and having a dark background, is positioned against the primary film. The primary film is then exposed a second time, and the image contained on the other secondary film is recorded on the primary film. The images recorded on the primary film are a composite image. Three embodiments of mechanisms for movement and location of the secondary films are disclosed including a wheel, a sliding framework, and a slidable rectangular film sheet.

6 Claims, 9 Drawing Sheets

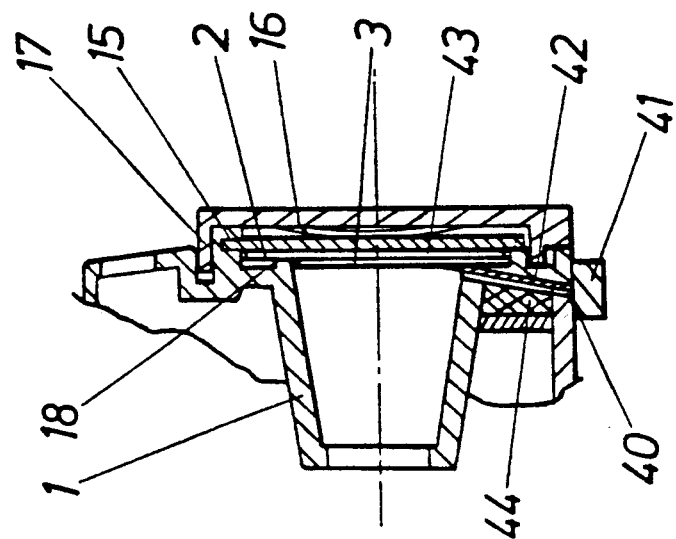
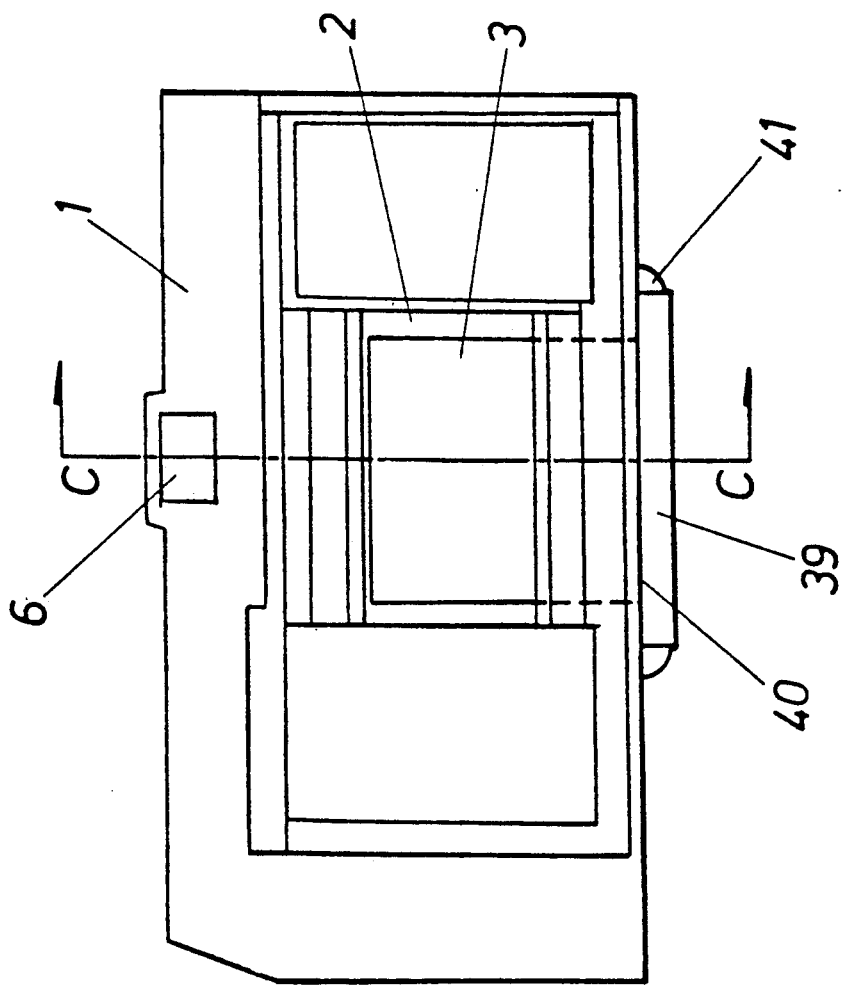
FIG. 9-2
FIG. 9-1

METHOD AND A CAMERA FOR COMBINATION PICTURES IN A PHOTOGRAPH

BACKGROUND OF THE INVENTION

The present invention relates to a method for combining pictures on a photograph by a camera, and a camera with secondary image or picture producing device for the production of combination pictures in a photograph.

Many types of combination processes are known and used to combine two or more images, pictures or photographs, at negative or positive stage, to create special effect in photographs. However, the known techniques of photomontage are usually rather laborious and time consuming.

SUMMARY OF THE INVENTION

It is an object of the present invention to provide a method of combination of pictures on a photograph by a camera with a secondary image or picture producing device.

It is another object of the present invention to provide a camera with a secondary image or picture producing device for the production of combination pictures in photograph.

It is still another object of the present invention to produce combined images or pictures by a single picture-taking operation.

It is yet another object of the present invention to produce collages or combination photographs without making use of complicated and laborious technique of photomontage in the negative or positive such as cut-and-paste, enlarging or reducing, registering, masking and processing According to one aspect of the present invention, there is provided a method of combination of pictures on a photograph by a camera with a secondary picture producing device comprising steps of preparing a set of three secondary films each provided on each thereof with a secondary image or picture in the same shape and size, wherein a first secondary film has a colour image or picture on a transparent background, a second secondary film has a black image or picture on a transparent background, a third secondary film has a colour image or picture on a black background; fixing the first secondary film into a frame of a viewer at a distance of at least 15 mm before the front of the lens system of the viewer; fixing the second and third secondary films on a plane of a secondary film carrying means disposed between a primary film and a lens system of the camera; moving the secondary film carrying means to make the second secondary film located before and close to a primary film on a position defined by the film gate of the camera; determining the relative positions of primary and the secondary images to be produced on a photograph through an observation by the viewer; effecting a first exposure for recording the image of a subject on the primary film while leaving an unexposed portion of the same shape and size as the secondary image or picture; changing the second secondary film with the third secondary film by moving the secondary film carrying means; effecting a second exposure after putting a transparent opal glass or the like, or a white plane before or behind the lens of the camera for allowing only white light to enter the camera, thereby the secondary image or picture of the third secondary film is just recorded on the unexposed portion of the primary film accompanying with the image of the subject, and according to another aspect of the present invention, there is also provided a camera with secondary picture producing device for production of combination pictures on a photograph comprising: a set of three negative or transparent secondary films with secondary image or picture provided thereon: a first secondary film having a colour image or picture on a transparent background, a second secondary film having a black image or picture on a transparent background, a third secondary film having a colour image or picture on a black background, and the images of pictures on all of the three secondary films have the same shape and size; a main body having both a casing provided with an entrance portion for fixing or removing a secondary film into the camera and a positioning member for locking the secondary film at an exposure position; a viewer provided in the main body comprising a traditional three lenses system and a film frame disposed at the front of the lenses system in a distance of at least 15 mm for holding the first secondary film, the plane defined by the film frame is perpendicular to the axis of the lenses system and centered on the same axis, the visual angle of the viewer is coincident with the size of the first secondary film holded in the film frame of the viewer; a secondary film carrying means disposed in an inner chamber of the camera for fixing the second secondary film and/or the third secondary film thereon and carrying them individually into a same exposure position defined by the film gate of the camera as well as before and close to the primary film of the camera; a handle means attached to the secondary film carrying means and protruding outside the camera body for thereby moving or removing the secondary film into or from the same exposure position without opening the camera; a position locking means connected with the handle means and matched with the positioning member of the camera body for locking the secondary film carrying means in the same position; an indicating means connected with the handle means for indicating the position of the secondary film.

DESCRIPTION OF THE DRAWINGS

FIGS. 2-1, 2—2, 2-3 show a set of secondary negative or transparency films, wherein FIG. 2-1 shows a first secondary film, FIG. 2—2 a second secondary film, and FIG. 2-3 a third secondary film.

FIG. 3 shows a viewer of the camera.

FIG. 7-1 is a first embodiment of the camera in accordance with the present invention.

FIG. 7-2 is a diagrammatical vertical cross-sectional view of the camera taken along a line A—A shown in FIG. 7-1.

FIG. 8-1 is a second embodiment of the camera in accordance with the present invention.

FIG. 8-2 is a diagrammatical vertical cross-sectional view of the camera taken along a line B—B shown in FIG. 8-1.

FIG. 9-1 is a third embodiment of the camera in accordance with the present invention.

FIG. 9-2 is a diagrammatical vertical cross-sectional view of the camera taken along a line C—C shown in FIG. 9-1.

FIG. 9-3 is a secondary film carrying means and a secondary film fixed thereon employed in the third embodiment shown in FIG. 9-1.

DESCRIPTION OF THE PREFERRED EMBODIMENTS

Figure 1:
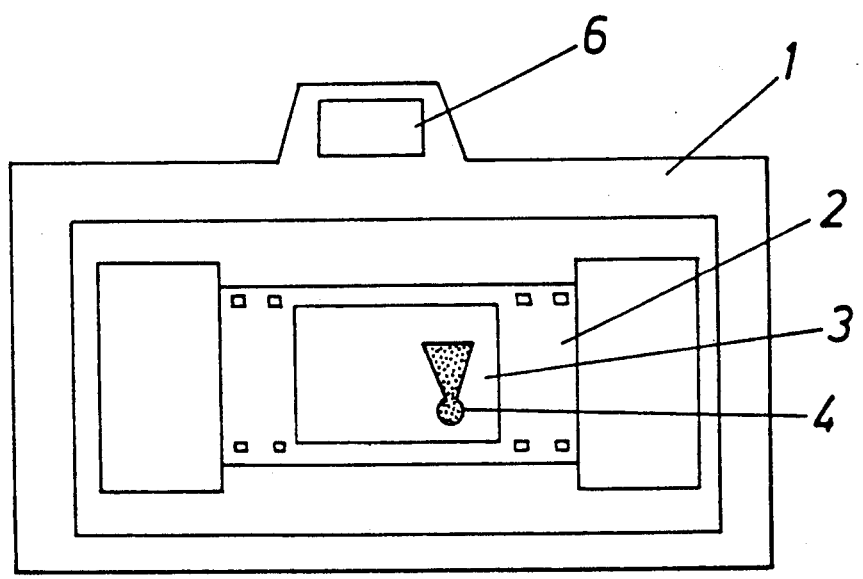
FIG. 1 shows a rear view of a main body of a camera.

Referring now in more detail to the drawings, in which like reference numerals represent like parts throughout the several views, FIG. 1 shows the rear view of a main body of a camera designated generally by reference numeral 1. The back cover of the camera is removed to reveal the inner chamber of the camera. A primary film 2 is loaded in the camera and a secondary film 3 is positioned on the front of the primary film 2.

Figures 1, 2:
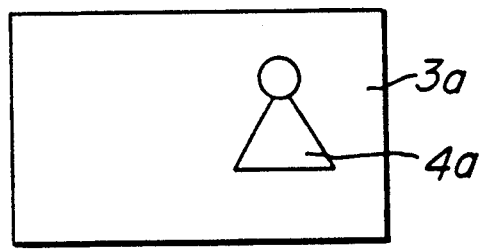
Figure 2:
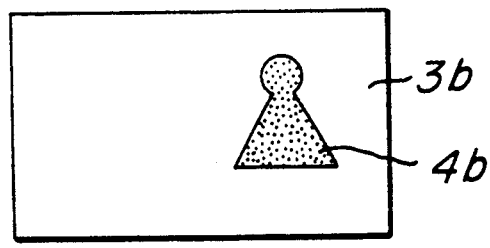

According to the present invention, there is provided a set of negative or transparent films comprising three secondary films 3a, 3b, 3c as shown in FIG. 2. In those films, there are images or pictures 4 in the same shape and size but in different colours prepared respectively, the film 3a is a transparent film prepared with a colour image 4a thereon, the film 3b is also a transparent film but prepared with a black image 4b thereon, while the film 3c has black background and a colour image or picture 4c which is desired to be combined with an image of a subject 5 on a photograph.

Figures 2, 3:
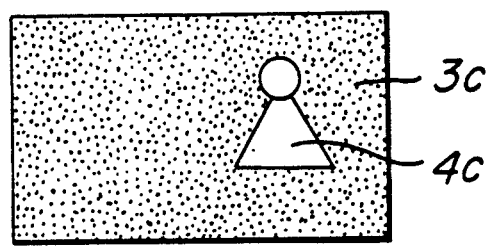
Figure 3:
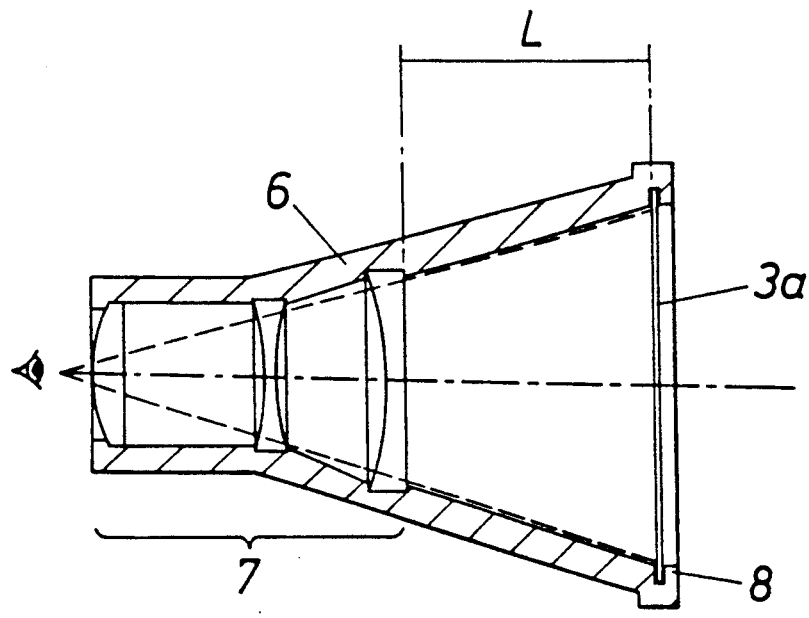

An arrangment of those films and a procedure of combination of pictures on a photograph are described hereafter:

At first, the secondary film 3a is inserted into a viewer 6 in a position at a distance L from a front lens of the viewer 6 as shown by FIG. 3, and the distance of L is preferably more than 15 mm. The secondary film 3b is positioned close to a primary film 2 between the primary film 2 and the lens of the camera.

Before taking a picture of a subject, a relative positions of the image of the subject 5 and the desirous image or picture 4 to be (hereafter "secondary image") must be determined by means of an observation through the viewer 6 to avoid an overlap and some other undesired arrangment of those two images, or otherwise, a user must aim the camera at the subject delineating or framing the area to be recorded taking consideration of the composition of the secondary image 4 which will also be recorded on the photograph during exposure.

After adjusting the relative positions of two images or pictures mentioned above, the first exposure can be started.

Figure 4:
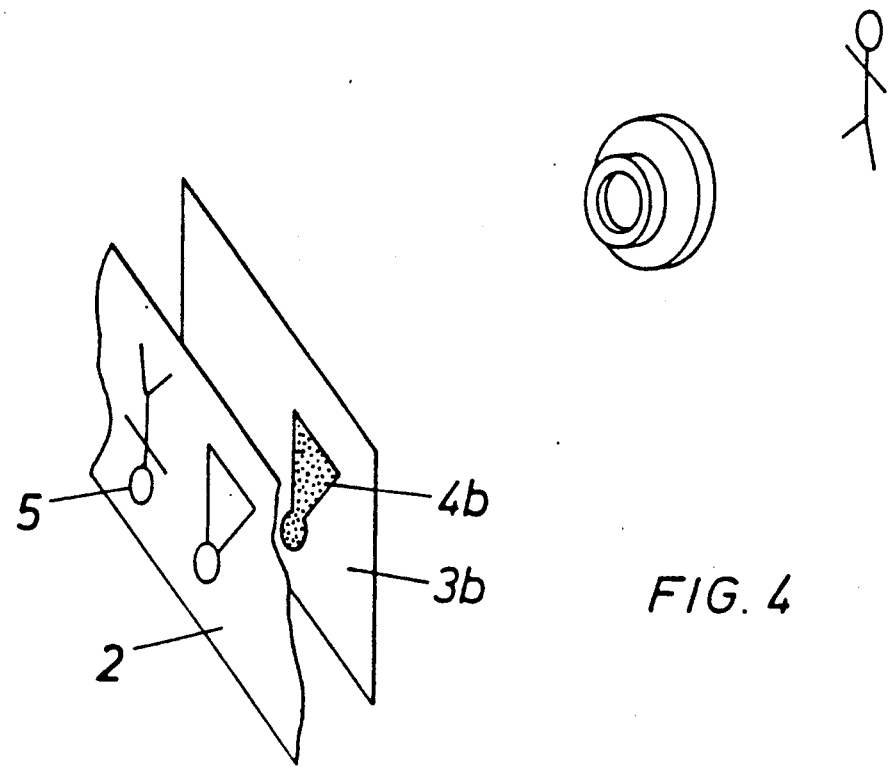
FIG. 4 is a diagram showing the first exposure for explaining the principle of producing combination pictures in accordance with the present invention.

On the first exposure, as explained by FIG. 4, the image or picture of the primary subject 5 is recorded on the primary film 2, besides, an unexposed portion having a shape and size as same as that of the secondary image 4b on the secondary film 3b is left on a proper position of primary film 2 due to the secondary image 4b on the secondary film 3b is blackened for shutting out incident light.

Figure 5:
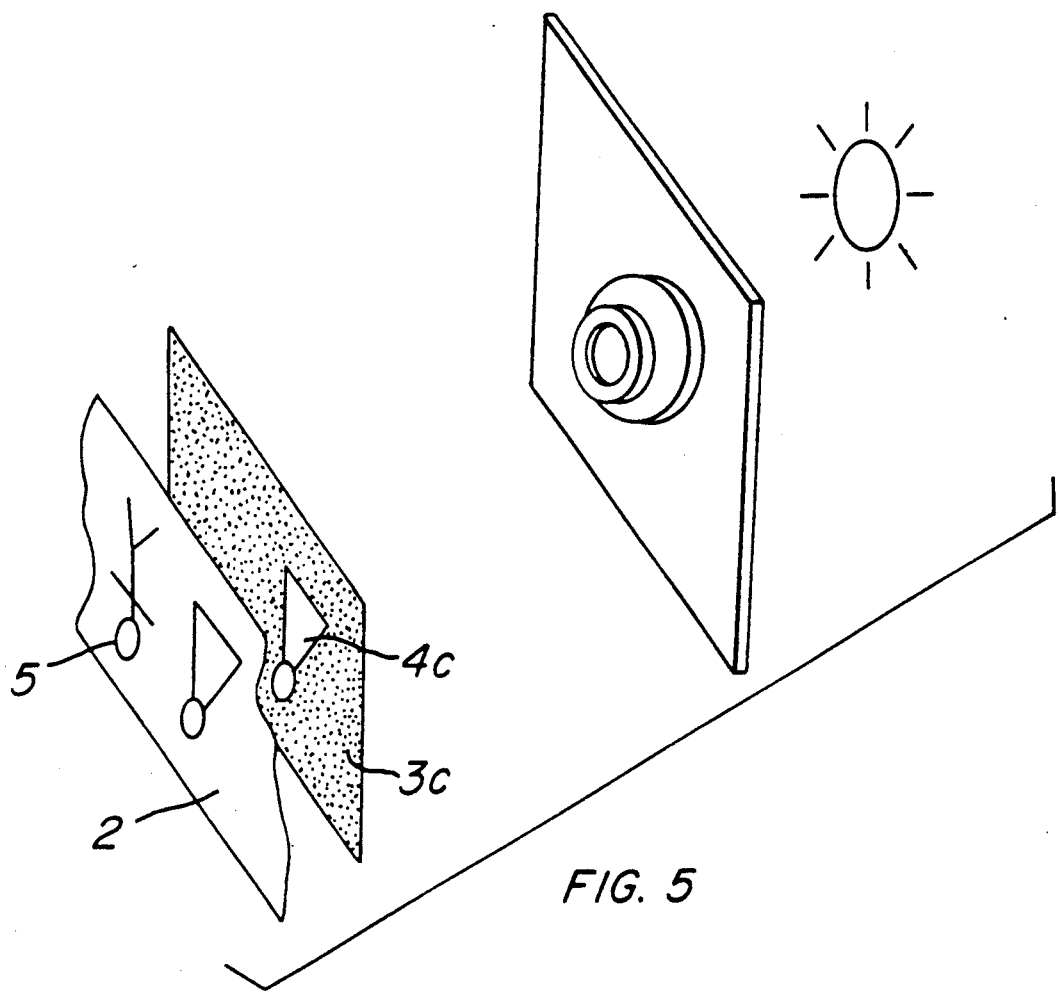
FIG. 5 is a diagram showing the second step of exposure for explaining the principle of producing combination pictures
Figure 6:
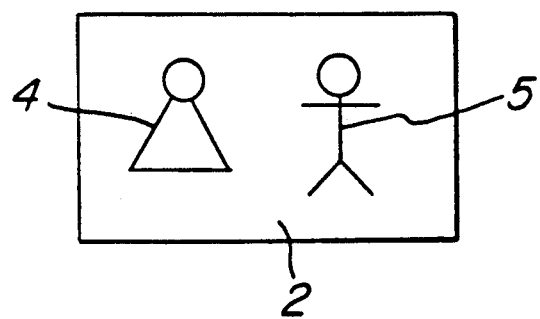
FIG. 6 is an explanatory diagram of a photograph showing the combined pictures thereon.

After the first exposure, the secondary film 3b is removed, an another secondary film 3c is correctly inserted into the same position as the film 3b positioned by precision positioning means. At this time, the primary film 2 keeps its original state without any move or shift, thus the colour image or picture 4c of the secondary film 3c and the unexposed portion of the primary 2 are accurately overlapped. In addition, a transparency opal glass or the like must be disposed in the front or behind of the lens of the camera, or the lens of the camera should be aimed at a white plane to allow white light to enter the lens only and prevent from incidence of any other image into the lens of the camera, as shown in FIG. 5. Thus, the second exposure can be made. Accordingly, the desired secondary image or picture 4 is recorded on a proper portion of the primary film 2 without suffering from any outside influence, thus, a combination of image of the primary subject 5 and the secondary image 4 on the primary film 2 is completed. FIG. 6 is a diagram of the combination photograph. An advantage of the present invention is that the combination of images can be effected even if the background of the primary subject 5 is complex.

According to the principle of combination pictures in a photograph mentioned above, three embodiments of the present invention are provided herewith.

Primarily, three secondary films 3a, 3b, 3c are prepared in all of those three embodiments.

And, a specially designed viewer 6 is provided in the camera body 1 for observing relative position of a primary subject 5 and the secondary image 4. The viewer 6 comprises a traditional three lenses system 7 and a film frame 8 provided at the front of the lenses system in a distance L (L>15 mm is preferred), the film frame 8 having an inner groove with width of 0.3–0.5 mm is employed to be inserted with the secondary film 3a therein, the plane of the film frame 8 is perpendicular to the axis of the lenses system 7 as well as centered on the same axis, additionally, the viewer 6 is such designed that the secondary film 3a inserted in the groove is coincident with the range of the visual angle of the viewer 6 to ensure the center of the primary film 2 coincident with the view center of the viewer 6.

Figures 1, 7:
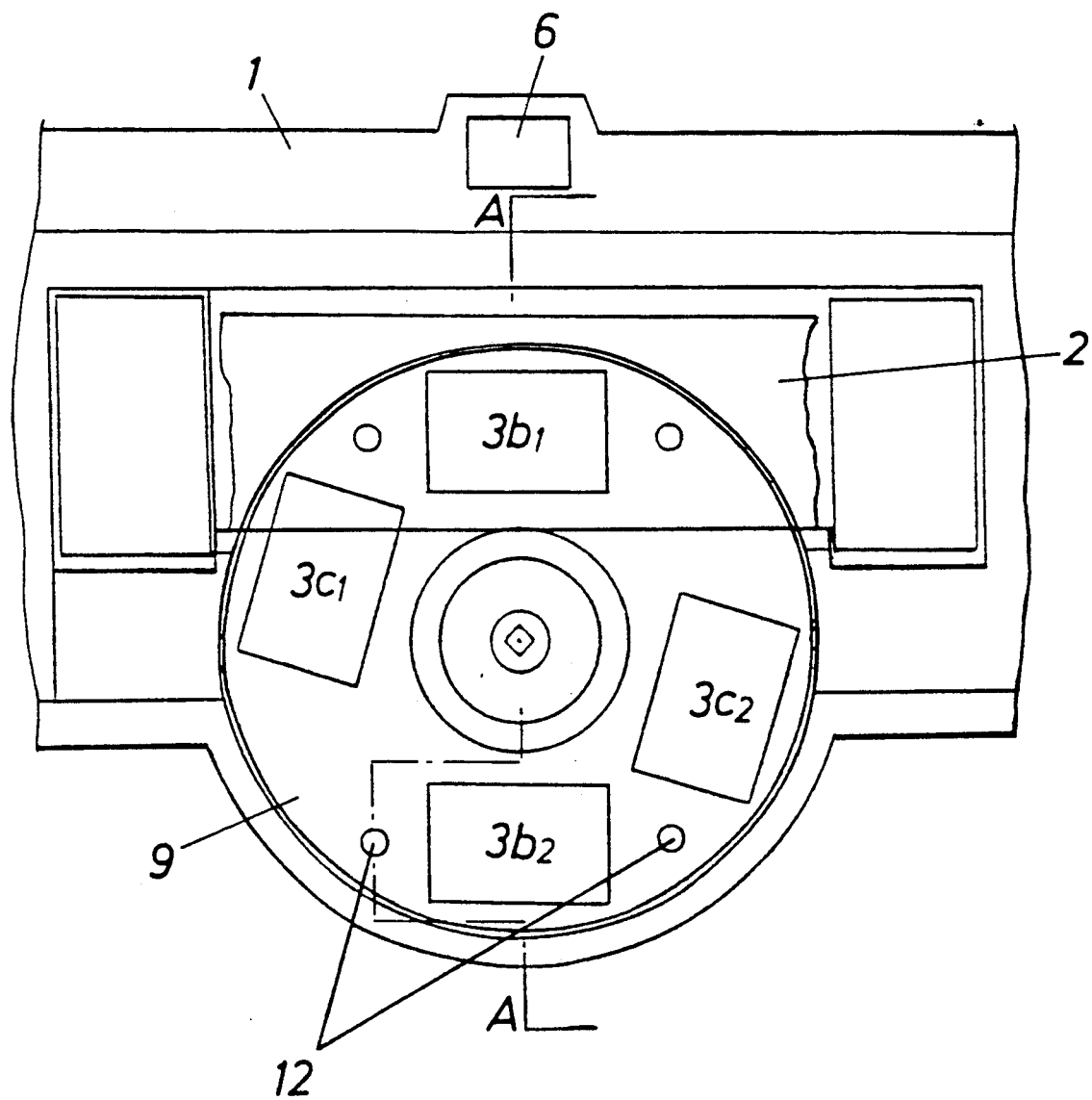
Figures 2, 7:
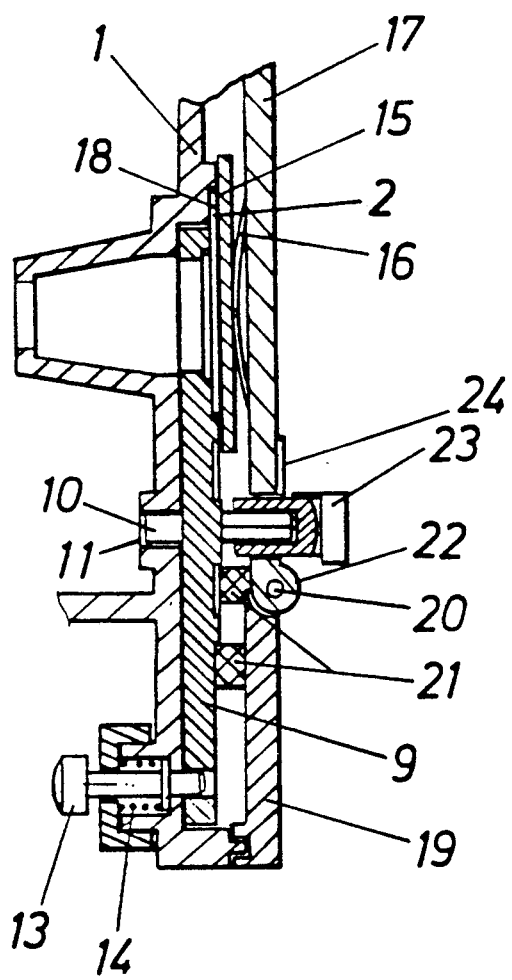

The first embodiment of the present invention is described with reference to FIGS. 7-1 and 7-2.

A turning disk 9 for carrying the secondary films 3b and 3c is disposed in the camera body 1 between a film gate 18 and a primary film 2, the turning disk 9 comprises a shaft 10 with one end portion thereof inserted into a shaft bore 11 provided in the lower portion of the camera body 1 and another end portion protruding outside of the rear casing of the camera, the turning disk 9 is also provided with position holes 12 for holding position pin 13, the position pin 13 is inserted into the position hole 12 from outside the camera through a relative pin-hole 14 provided on the lower portion of the camera body 1. The turning disk 9 is such designed that the plane of the disk and thereby the planes of secondary films 3b, 3c carried thereon are parallel and close to the plane of the primary film 2, the position holes 12 and corresponding pin-holes 14 of the camera body 1 are used to ensure that each of the secondary films 3b and 3c can be correctly fixed at the same exposure position in the front of the primary film 2.

Behind the primary film 2, a press plate 15, a spring plate 16 and a rear cover 17 are provided in an order as mentioned for pressing the primary film 2 close against the edges of the film gate 18 which defines as the focal plane of the lens of the camera.

A disk cover 19 capable of being turned open around a shaft 20 is provided, when the disk cover 19 is opened, the secondary film 3b or 3c can be fixed or removed on or from the turning disk 9, rubber like members 20 are provided between the turning disk 9 and the disk cover 19 as well as a bearing means 22 of the disk cover shaft 20 for serving the purposes of light-tightness and dust elimination, a knob 23 protruding outside the rear cover 17 is connected with the shaft 10 of the turning disk 9 for turning the disk 9 on a desired position, and an indicate means 24 for indicating the turning angle is assembled on the shaft 10 and behind the rear cover 17.

Based on the arrangment of the first embodiment mentioned above, a combination pictures in a photograph can be produced in a procedure as following:

inserting the film 3a into the viewer 6;

turning the knob 23 to position the film 3b on to the exposure position before the primary film 2 as mentioned previously;

inserting the position pin 13 into a position hole 12 through pin-hole 14 of the camera;

observing the primary subject 5 and the secondary image or picture 4a through the viwer 6, and adjusting the relative positions of those two images;

pressing the shutter button to make the first exposure;

removing the position pin 13, and turning the knob 23 to turn the disk 9 and make the secondary film 3c on to the exposure position as same as the film 3b located;

inserting the position pin 13 into a corresponding position hole 14;

putting a transparency opal glass or the like on the front of the lens, or aim the lens of the camera to a white plane;

pressing the shutter button to make the second exposure;

finally, both the image 5 of the primary subject and the secondary image 4 are recorded on the primary film 2.

A second embodiment of the present invention is described with reference to FIGS. 8-1 and 8-2.

The main body 1 of the camera, the viewer 6 provided therein and secondary films 3a, 3b, 3c previously prepared are basically similar to those in the first embodiment. The distinct structure of the second embodiment will now be described.

Figures 2, 8:
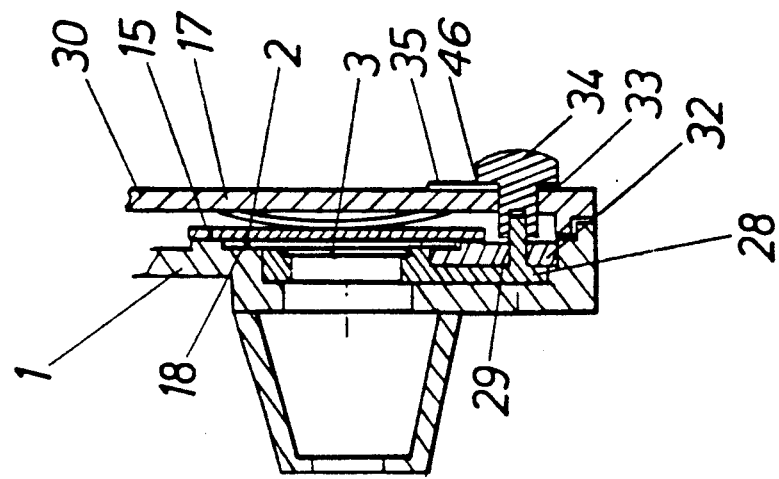
Figures 1, 8:
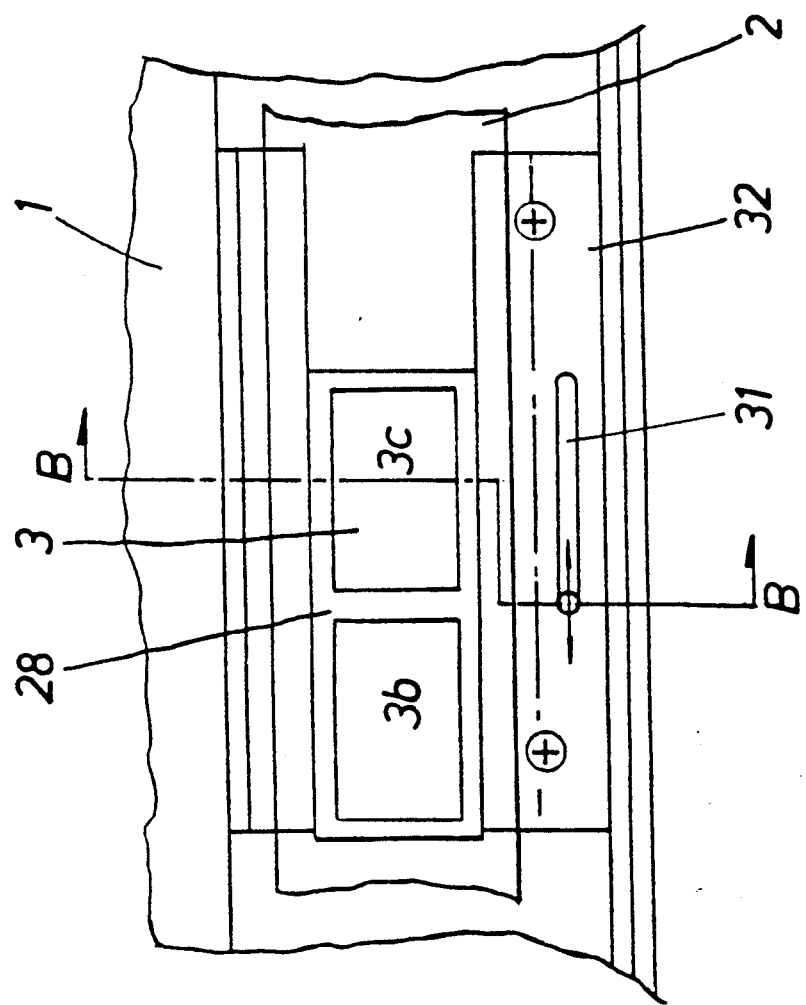

In the chamber of a camera there is provided a sliding frame 28 between the film gate 18 and the front of a primary film 2 for carrying the secondary film 3 into an exposure positions the films 3b and 3c are fixed on the upper portion of the sliding frame 28 as shown in FIG. 8-1, a column 29 fixed in the lower portion of the sliding frame 28 protrudes backwardly through a guide slot 31 opened on a cover plate 32 which is disposed in the camera behind the lower portion of the sliding frame 28, the rear cover 30 having a horizontal slot 33 on the lower portion thereof for allowing a sliding handle 34 to be slid therein, the sliding handle 34 having a head part protruding outside the rear cover 30 and an other end connecting with the column 29 of the sliding frame 28 can be handled to move the secondary film 3b or 3c fixed on the sliding frame 28 on to a correct exposure position at the front of the primary film 2, a position indicating means 35 is provided behind the rear cover 30 for indicating the position of the sliding handle 34, a lock means 46 is provided to lock the sliding handle 34 at a correct position.

The arrangement of the second embodiment of the present invention mentioned above is such designed that the plane of the secondary film 3b or 3c is parallel and close to the plane of the primary film 2 when the sliding frame 28 is moved, films 3b and 3c can be positioned exactly at the same exposure place.

The procedure of the operation of the second embodiment is similar to that of the first embodiment except the change manner of secondary films 3b and 3c, that is, secondary films 3b and 3c are changed through translation al motion of the sliding frame 28 in the second embodiment while in the first embodiment are through the turn of the turning disk 9.

Figures 3, 9:
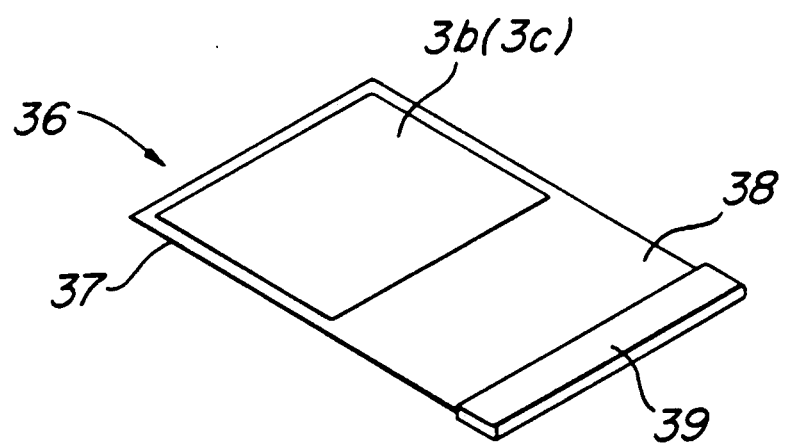

FIGS. 9-1, 9-2 illustrate third embodiment of the present invention.

The main body 1 of the camera, the viewer 6 provided therein and secondary films 3a, 3b, 3c previously prepared are basically similar to those in the first embodiment.

The secondary films carrying means takes a form of a rectangular film sheet 36 and have a first end portion 37 and a second end portion 38. A secondary film 3b or 3c is provided on the first end portion 37 and is located into the camera between the film gate 18 and the front of the primary film 2. The edge of the second end portion 38 is fixed with a fingerhold means 39 to facilitate the insertion and removal of the film sheet 36 into and from the camera, as well as to position secondary film 3b or 3c at a correct exposure position on the front of the primary film 2.

On the base of the camera there is provided a slot 40 for inserting the film sheet 36 into the camera therethrough, a pair of position blocks 41 are disposed at two ends of the slot 40 for defining a correct space to hold the fingerhold means 39 of the film sheet 36 therebetween A first pair of film guide rails 42 extending inwardly from respective ends of the slot 40 and terminating at the lower edge of the film gate 18, are used to guide the insertion of the film sheet 36 into the camera, the plane of the first pair of guide rails 42 is disposed at an angle with respect to the focal plane of the lens.

A second pair of film guide flanges 43 extending from the first pair of film guide rails 42 and terminating at the upper edge of the film gate 18, are provided integrally on the side edges of the film gate 18 to provide further guidance to the insertion of the film sheet 36 into the camera. The plane of the second pair of film guide flanges 43 is disposed in parallel relationship with the focal plane of the lens of the camera.

Further support means 44, such as foam members, is employed to support and hold the film sheet 36 in a fixed position of the camera.

In this embodiment, the film sheet 36 is designed in such manner that the length of the sheet is matched with the length of the guide path from the upper edge of the film gate 18 to the end of the slot 40 for positioning the secondary films precisely.

The distinct character of this embodiment from the first and the second embodiments is that, the secondary film 3b and 3c can be inserted or removed into or from the camera individually according to the requirement of the operation procedure of combination of pictures.

What is claimed is:

1. A method for combining pictures on a photograph in a camera having a camera body, a lens system, a primary film, a film gate located in said camera body at a focal plane of said lens system, said primary film being locatable in said film gate, said camera having a viewer for retailing and viewing a transparency, said viewer having a lens system, whereby said viewed transparency is provided in a viewed frame which corresponds to a viewed from each said camera lens system, with secondary picture producing device comprising the steps of:

preparing a set of three secondary films each provided with an image or picture in the same shape and size, wherein a first secondary film has a colour image or picture on a transparent background, a second secondary film has a black image or picture on a transparent background, a third secondary film has a colour image or picture on a black background;

locating the first secondary film into a frame of said viewer at a distance of at least 15 mm before the front of said viewer lens system;

locating the second and third secondary films on a plane of a secondary film carrying means disposed between said primary film and said camera lens system;

moving the secondary film carrying means to locate said second secondary film closely adjacent to aid primary film between said primacy film and said camera lens system;

determining the relative positions of primary and the secondary images produced on a photograph by observation through said viewer;

effecting a first exposure for recording the image of a subject on the primary film and while leaving an unexposed portion of the same shape and size as the secondary image or picture;

removing the second secondary film and locating the third secondary film in its place by moving the secondary film carrying means, had effecting a second exposure using means for allowing only white light to enter the camera whereby said image or picture of the third secondary film is recorded on the unexposed portion of the primary film.

2. A camera with secondary picture producing device for production of combination pictures on a photograph comprising:
   a camera lens system;
   a set of three negative or transparent secondary films with a secondary image or picture provided thereon comprising a first secondary film having a colour image or picture on a transparent background, a second secondary film having a black image or picture on a transparent background, a third secondary film having a colour image or picture on a black background, the images or pictures on all of the three secondary films having the same shape and size;
   a main camera body having both a casing provided with an entrance portion for fixing or removing a secondary film into the camera and a positioning member for locking the secondary film at an exposure position;
   a viewer provided in the main body comprising a lens system having an axis and a film frame disposed at the front of the lens system in a distance of at least 15 mm for holding the first secondary film, the film frame defining a plane which is perpendicular to the axis of the lens system and centered on the same axis, the visual angel of the viewer being coincident with the size of the first secondary film held in the film frame of the viewer;
   secondary film carrying means disposed in an inner chamber of the camera for fixing the second and third secondary films thereon and carrying them sequentially into a same exposure position closely adjacent to the primary fill of the camera between said primary film and said camera lens system;
   handle means attached to the secondary film carrying means and protruding outside the camera body for moving or removing the secondary film into or from the same exposure position without opening the camera;
   position locking means connected with the handle means and matched with the positioning member of the camera body for locking the secondary film carrying means in the same position, and
   indicating means connected with the handle means for indicating the position of the secondary film.

3. A camera with secondary picture producing device as claimed in claim 2, wherein
   aid secondary film carrying means comprises a turning disk disposed in the camera body, said turning disk comprising a shaft with one end portion thereof inserted into a shaft bore provided in a lower portion of the camera body and another end portion protruding outside of a rear portion of said casing of the camera, and position holes for holding a position pin inserted therein, said second and third secondary films being disposed on the plane of said turning disk;
   said handle means comprising a knob provided outside the rear portion of said casing of the camera and connected with the shaft of the turning disk;
   the position pin for locking the turning disk is inserted into a position hole of the turning disk from outside of the camera through a pin hole in the lower portion of the camera; and
   said indicating means is assembled with the shaft of the turning means outside the rear casing of the camera.

4. A camera with secondary picture producing device as claimed in claim 3, wherein
   a lower portion of said rear casing of the camera is provided iwth an operable disk cover whereby said disk cover can be opened for fixing and removing the secondary film on or from the turning disk.

5. A camera with secondary picture producing device as claimed in claim 2, wherein
   said secondary film carrying means comprises a rectangular sliding frame disposed in the inner chamber of the camera, th sliding frame being provided with a column protruding outside the camera on the lower portion thereof;
   said first and second secondary films are longitudinally fixed on the sliding frame with an interval therebetween;
   said handle means is formed as a sliding handle having a head disposed outside a rear casing of the camera and another end connected with the column of the sliding frame; and
   said mean body of the camera is provided iwht a rear casing having a horizontal slot opened at a lower portion thereof for allowing the handle means to be slid laterally therein.

6. A camera with secondary picture producing device as claimed in claim 2, wherein
   said secondary film carrying means comprises a set of two rectangular film sheets each having a first end portion for fixing one secondary film thereon, and a second end portion attached with a fingerhold means for inserting or removing he secondary film into or from the camera and positioning the secondary film at the same exposure position; and
   said main body of the camera is provided iwth an elongated slot on the base thereof four loading or removing the film sheet, a guide means extending inwardly from the end of the slot for guiding the film sheet inserted therein, and a pair of position blocks disposed at two ends of the slot for locking the fingerhold means of the film sheet.

* * * * *